UNITED STATES PATENT OFFICE.

HERMAN L. HARTENSTEIN, OF CHICAGO, ILLINOIS, ASSIGNOR, BY MESNE ASSIGNMENTS, TO ELECTRO CHEMICAL & DEVELOPMENT COMPANY, OF PIERRE, SOUTH DAKOTA, A CORPORATION OF SOUTH DAKOTA.

LINING FOR ELECTRIC OR OTHER FURNACES AND METHOD OF PREPARING THE SAME.

No. 819,223.          Specification of Letters Patent.          Patented May 1, 1906.

Application filed July 23, 1902. Renewed September 30, 1905. Serial No. 280,728.

*To all whom it may concern:*

Be it known that I, HERMAN L. HARTENSTEIN, a citizen of the United States, residing at Chicago, in the county of Cook and State of Illinois, have invented a new and useful Lining for Electric or other Furnaces and Method of Preparing the Same, of which the following is a specification.

This invention relates to lining for electric or other furnaces and method of preparing the same.

In the manufacture of carbolite or carbid an electric or other furnace is supplied with a charge of material, which charge is then subjected to the fusing action of heat in order to reduce the charge to a melted condition to effect the conversion of the charge into carbid.

In a copending application, executed July 14, 1902, I have set forth and described a method of making carbid in which the charge is supplied in a highly-heated condition to the fusing-furnace. By reason of the intense heat generated in the electric or other fusing furnaces during the supply of the highly-heated charge thereto or during the fusing or converting operation the fusing-furnaces or the linings therefor, and especially the linings, are raised to a high degree of temperature, frequently resulting in reducing the linings to a molten or softened condition, thereby causing the same to crack, warp, or bend and render such linings subject to abrasion, and hence is rapidly destroyed, requiring frequent renewals and replacements. Moreover, in furnaces of this nature, and especially in the case of electric furnaces, it is exceeding desirable to provide linings for the furnace which offer resistance to the electric current, thereby enabling all the current used to be devoted to the work of fusing the charge. It is also desirable to employ linings which are non-heat conducting or conducting heat poorly.

It is the special object of my present invention to provide a lining for electric or other furnaces and a method of preparing the same in a simple and efficient manner and thoroughly practical commercially wherein the lining is capable of resisting the high temperature to which the furnace-chamber is raised and whereby cracking, bending, or warping the lining is prevented and avoided and wherein the lining opposes resistance to the current employed for fusing—that is, is non-conducting electrically and is also a non-heat conductor—and wherein the danger of softening or melting the lining under the intense heat to which it is subjected is avoided and prevented.

In carrying out my invention I employ asbestos, anhydrous pitch, tar, or resin, cream of lime, and coke and form the same into suitable bricks, blocks, or slabs and apply the same to the walls of the furnace as the lining therefor. The asbestos, preferably such as is obtained in Canada or the United States, on account of the low percentage of protoxid of iron contained therein, is throughly mixed in the dry with the pitch, tar, or resin, which is previously pulverized, in about the proportion of ninety pounds of asbestos to ten pounds of pitch, tar, or resin. The short fiber of asbestos may be employed. The cream of lime is prepared by slaking ordinary lime with an excess of water to a consistency of thick cream. The coke is used in a finely-pulverized condition. To the pulverized coke the cream of lime is added and the mass thoroughly mixed. To this mixture about one-twentieth (1-20) per cent., by weight, of the asbestos, pitch, tar, or resin mixture is added and the mass thoroughly stirred and mixed and kneaded. The resulting mass, after a thorough mixture and which is but slightly moist, may then be pressed into bricks, blocks, slabs, or otherwise by means of molds or otherwise and, if desired, subjected to hydraulic or other pressure, and, if desired, the bricks, blocks, or slabs may then be dried, or, if desired, by means of an ordinary drying-oven. If required for shipment they should be heated to a temperature of 800° or 900° Fahrenheit; but this is not essential where they are used at the place of their manufacture.

In order to apply the bricks, blocks, or slabs to the inside surface of the furnace-chamber, I employ a compound composed of the asbestos, resin, tar, or pitch mixture and finely-pulverized lime in the proportion of one hundred pounds of the mixture to three hundred pounds of lime. This compound may be and preferably should be used in the dry state. However, it may be used in a slightly-moistened condition, and the inner surface of the furnace-chamber is coated therewith and the bricks, blocks, or slabs prepared as above described are arranged in place thereon. Upon heating the furnace this mixing compound "sinters" or sticks to the furnace-surface and also to the lining blocks or slabs by reason of the tar, pitch, or resin constituent thereof, thereby binding the lining to the furnace-surface. The lime and asbestos contents of the fixing compound, as well as of the lining bricks, blocks, or slabs, serves not only as a non-conductor of electricity in case of the use of my invention in an electric furnace, but also serves as a non-conductor of heat.

A furnace-lining of the nature described and produced in the manner set forth resists in a remarkable degree the action of the heat to which the furnace-chamber is subjected and is not softened or melted by such heat. It does not crack, warp, or bend and shows a greater resistance to abrasion than ordinary stone or brick. It is light in weight and possesses elasticity to a remarkable degree. It is a non-conductor of heat as well as of electricity. It is economical in manufacture, as the constituent elements thereof are plentiful and easily obtainable, and in the use of such lining the cost of carbid manufacture is greatly reduced, in that frequent or constant repairs or relining of the furnaces employed is avoided. When repairs or relining is necessary, the same may be effected efficiently and expeditiously.

I do not desire to be limited or restricted to the exact proportion of materials specified, as the same may be varied or altered throughout a wide range without departure from the spirit or scope of my invention. The proportion specified, however, I have found efficient and satisfactory under ordinary conditions.

Having now set forth the object and nature of my invention and the manner of carrying the same into practical operation, what I claim as new and useful and of my own invention, and desire to secure by Letters Patent, is—

1. The method of preparing linings for electric or other furnaces, which consists in mixing together asbestos, a hydrocarbon adherent, cream of lime and coke, and then forming the same into bricks, blocks or slabs, as and for the purpose set forth.

2. The method of making linings for electric or other furnaces, which consists in mixing together cream of lime and pulverized coke and then adding thereto a mixture of asbestos and a hydrocarbon adherent, then forming the same into bricks, blocks or slabs, and then pressing and drying the same, as and for the purpose set forth.

3. As a new article of manufacture, a lining for electric or other furnaces, composed of a thorough admixture of coke, cream of lime, asbestos and a hydrocarbon adherent, as and for the purpose set forth.

4. As a new article of manufacture, a lining for electric or other furnaces in the form of pressed and dried bricks, blocks or slabs, composed of powdered coke, cream of lime, a powdered hydrocarbon element and asbestos in about the proportion specified, as and for the purpose set forth.

5. As a new article of manufacture, a lining for electric or other furnaces, composed of powdered coke, slaked lime, an adhesive element, and a non-heat and electric conducting element, said element being incombustible as and for the purpose set forth.

In witness whereof I have hereunto set my hand, this 19th day of July, 1902, in the presence of the subscribing witnesses.

HERMAN L. HARTENSTEIN.

Witnesses:
K. V. DARBY,
S. E. DARBY.